United States Patent [19]
Choate

[11] Patent Number: 5,956,886
[45] Date of Patent: Sep. 28, 1999

[54] FISHING LURE WITH LATERALLY SPACED SPINNER

[76] Inventor: Chris Choate, 3900 Bates St., St. Louis, Mo. 63116

[21] Appl. No.: 08/935,164

[22] Filed: Sep. 22, 1997

[51] Int. Cl.[6] .................................................. A01K 85/10
[52] U.S. Cl. ........................................ 43/42.13; 43/42.19
[58] Field of Search ................................ 43/42.19, 42.2, 43/42.21, 42.13

[56] References Cited

U.S. PATENT DOCUMENTS

| | | | |
|---|---|---|---|
| 1,591,704 | 7/1926 | Grube . | |
| 2,107,436 | 2/1938 | Flanagan | 43/39 |
| 2,167,945 | 8/1939 | Gilliam | 43/48 |
| 2,471,499 | 5/1949 | Shipman . | |
| 2,549,458 | 4/1951 | Grimm | 43/42.13 |
| 2,935,809 | 5/1960 | Pratt | 43/42.13 |
| 4,317,305 | 3/1982 | Firmin . | |
| 4,453,334 | 6/1984 | Opperman et al. . | |
| 4,619,068 | 10/1986 | Watawa . | |
| 4,742,639 | 5/1988 | Gunn | 43/42.13 |
| 4,887,378 | 12/1989 | Sheehan et al. . | |
| 4,984,950 | 1/1991 | Streed . | |
| 5,058,309 | 10/1991 | Firmin . | |
| 5,134,800 | 8/1992 | Sheehan et al. . | |
| 5,136,801 | 8/1992 | Pond . | |
| 5,146,706 | 9/1992 | Hilliard . | |
| 5,394,636 | 3/1995 | Rabideau . | |
| 5,469,652 | 11/1995 | Drosdak | 43/44.83 |
| 5,605,004 | 2/1997 | Boullt et al. . | |

OTHER PUBLICATIONS

Spinner bate lure No. 1 (Photo No. 1).
Spinner bate lure No. 2 (Photo No. 2).

*Primary Examiner*—Jack W. Lavinder
*Attorney, Agent, or Firm*—Howell & Kaferkamp, L.C.

[57] ABSTRACT

A fishing lure of the present invention comprises a weighted head, a hook fixedly connected to the head, a spinner arm extending downwardly from the head, and a spinner blade attached to a distal end of the spinner arm. The hook has a shank portion and a curved butt portion. The shank portion of the hook projects rearwardly from the head generally along a shank axis. The curved butt portion of the hook is at the rearward end of the shank portion, curves upwardly from the shank portion, and terminates in a barb.

20 Claims, 1 Drawing Sheet

FISHING LURE WITH LATERALLY SPACED SPINNER

BACKGROUND OF THE INVENTION

This invention relates generally to fishing devices and, more particularly, to an improved fishing lure.

Fishing lures having hooks and spinners are known in the art. Such lures typically have hooks and spinners extending in generally the same direction.

A common problem with lures having spinners is that the spinner assemblies tend to get caught in underwater obstructions such as weeds and tree branches. Therefore, there is a need for a fishing lure having a spinner assembly which is less susceptible to being caught in such underwater obstructions, or which is at least more likely to be freed from such obstructions if caught.

SUMMARY OF THE INVENTION

It is an object of the present invention to provide an improved fishing lure in which a hook and a spinner arm extend in generally opposite directions. Another object is to provide a fishing lure having a spinner blade which is less susceptible to getting caught in weeds and branches. Still another object is to provide a fishing lure which produces a unique action when moving through the water. Yet another object is to provide a fishing lure which is attractive to fish and which is likely to cause them to bite. Still another object is to provide a fishing lure which is easy to use and economical to manufacture.

In general, a fishing lure of the present invention comprises a weighted head, a hook, a spinner arm, and a spinner blade. The hook is fixedly connected to the head and includes a shank portion and a curved butt portion. The shank portion of the hook projects rearwardly from the head generally along a shank axis. The curved butt portion of the hook is at the rearward end of the shank portion, curves upwardly from the shank portion, and terminates in a barb. The spinner arm extends downwardly from the head and terminates at a distal end. The spinner blade is attached to the distal end of the spinner arm.

In another aspect of a fishing lure of the present invention, the curved butt portion of the hook curves outwardly from the shank axis in a first direction and terminates in a barb. The spinner arm has a proximal end and a distal end. The proximal end is fixedly connected to the head adjacent the shank axis. The spinner arm extends outwardly from the proximal end in a second direction and terminates at the distal end. The second direction is substantially opposite the first direction. The spinner blade is attached to the distal end of the spinner arm.

Other objects and features will be in part apparent and in part pointed out hereinafter.

BRIEF DESCRIPTION OF THE DRAWINGS

Reference characters in the written specification indicate corresponding parts throughout the several views of the drawings.

DETAILED DESCRIPTION OF THE PREFERRED EMBODIMENTS

Figure 1:
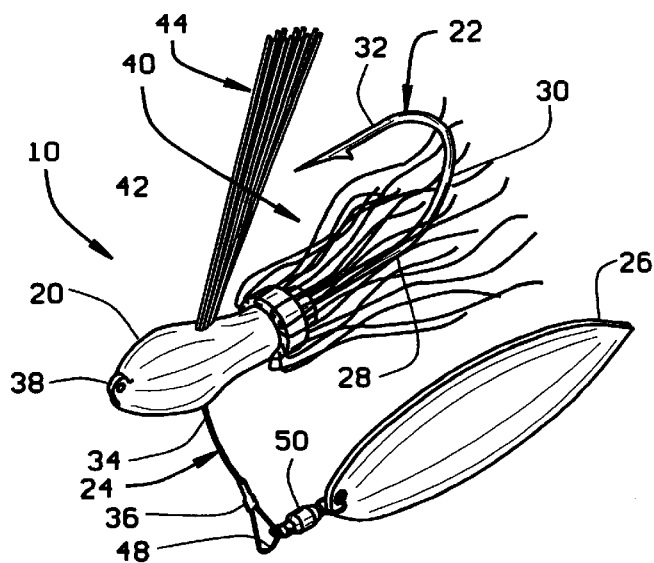
FIG. 1 is a perspective view of a fishing lure of the present invention.
Figure 2:
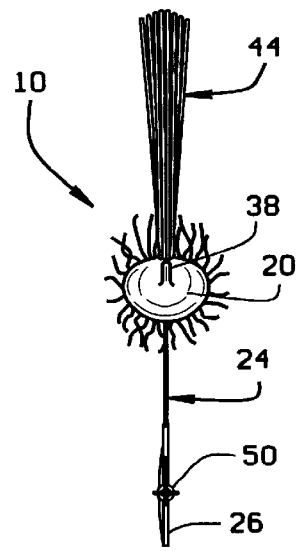
FIG. 2 is a front end elevational view of the fishing lure of FIG. 1.

A fishing lure of the present invention is represented in its entirety by the reference numeral 10. Generally, the lure 10 includes a weighted head 20, a hook, generally indicated at 22, a spinner arm, generally indicated at 24, and a spinner blade 26. As illustrated, the hook 22 includes a shank portion 28 and a curved butt portion 30. The shank portion 28 projects rearwardly from the head 20 generally along a shank axis S (see FIG. 3). The curved butt portion 30 is at the rearward end of the shank portion 28. The curved butt portion 30 curves upwardly from the shank portion 28, away from the shank axis S, and terminates in a barb 32. The spinner arm 24 has a proximal end 34 and a distal end 36. The proximal end 34 is fixedly connected to the head 20 adjacent the shank axis S. The spinner arm 24 extends downwardly from the proximal end 34, away from the shank axis S, and terminates at the distal 36. Thus, the curved butt portion 30 of the hook 22 and the spinner arm 24 extend in generally opposite directions from the head 20 and from the shank axis S. The spinner blade 26 is attached to the distal end 36 of the spinner arm 24.

Figure 5:
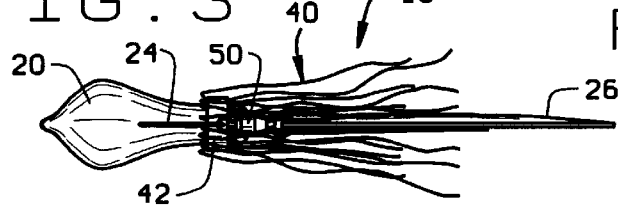
FIG. 5 is a bottom plan view of the fishing lure of FIG. 1.

The head 20 of the fishing lure 10 is generally oblong in shape and is constructed of lead or the like so as to constitute a weight. At the forward end of the head 20 is an eyelet 38 for attaching the head 20 to a fishing line (not shown). The forward end of the head 20 is generally round in shape and, as best shown in FIG. 5, bulges slightly outwardly along the shank axis S in the area of the eyelet 38.

The hook 22 is fixedly connected to the head 20. The shank portion 28 is generally straight and projects rearwardly from the tail end of the head 20 generally along the shank axis S. The curved butt portion 30 is bent from the rearward end of the shank portion 28 to curve upwardly, away from the shank axis S, and forwardly from the rearward end of the shank portion 28. The curved butt portion 30 terminates with the barb 32. Preferably, the hook 22 is substantially planar and lies in a vertical plane. Although the hook 22 is illustrated as having only one barb 32, additional barbs may be placed on the butt or shank portions of the hook without departing from the scope of the present invention.

A tail of fibrous material 40 or the like extends from the rear of the head 20 and is bound to the head adjacent the shank portion 28 with a resilient ring 42. The tail 40 could also be bound to the head 20 with wire, string, or the like, and could be attached to the shank portion 28 of the hook 22 rather than the head 20 without departing from the scope of the present invention. The tail 40 substantially encompasses the hook 22 and serves to mask the hook 22 and attract fish thereto.

A weed guard, generally indicated at 44, is employed to shield the butt portion 30 and barb 32 of the hook 22 from weeds and the like, thereby reducing the likelihood of the hook 22 getting snagged on such objects. The guard 44 extends from the top of the head 20 and extends generally upwardly and rearwardly along a weed guard axis W (see FIG. 3). The guard 44 comprises a plurality of bristles 46 attached at one of their ends to the top of the head 20. The bristles 46 are relatively stiff and sufficiently long so as to extend upwardly beyond the barb 32. The bristles 46 are also sufficiently pliable to deflect downward to permit embedment of the hook 22 in a fish's mouth. Alternatively, the guard could be comprised of a single member which has the necessary stiffness and pliability.

The spinner arm 24 extends downwardly from its proximal end 34 to its distal end 36 generally along a spinner arm axis X. Thus, the spinner arm and the curved butt portion 30 of the hook 22 extend in generally opposite directions from the head 20 and from the shank axis S. Preferably, the hook 22 and the spinner arm 24 lie substantially in the same plane, e.g., a vertical plane when the lure 10 is in an upright position as illustrated. Preferably, the weed guard axis W and the spinner arm axis X together form an angle A (see FIG. 3) which is greater than 90 degrees, but not greater than 180 degrees. More preferably, the weed guard axis W and the spinner arm axis X together form an obtuse angle.

Figure 4:
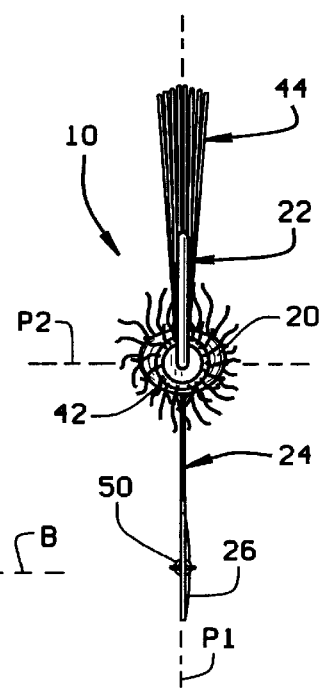
FIG. 4 is a rear end elevational view of the fishing lure of FIG 1.

The plane of the hook is shown in FIG. 4 as P1. The shank axis defines the intersection of a second plane P2 with plane P1. As shown in FIG. 4, plane P2 is substantially perpendicular to plane P1. Preferably, the barb 32 of the hook 22 is positioned above plane P2 and the distal end 36 of the spinner arm 24 is positioned below plane P2.

Figure 3:
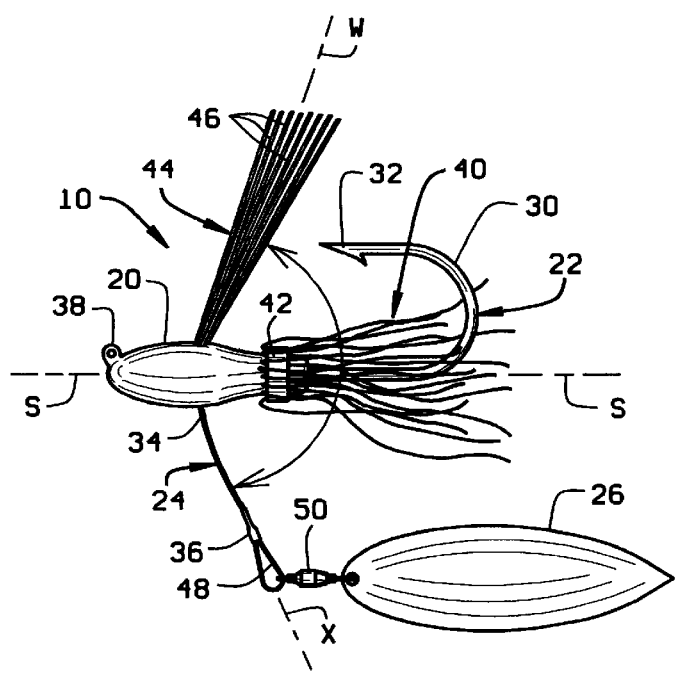
FIG. 3 is a side elevational view of the fishing lure of FIG. 1.

As best shown in FIGS. 1 and 3, the spinner arm 24 is preferably an elongate resilient member. In the preferred embodiment, the spinner arm 24 is comprised of nylon coated stranded metal wire. Preferably, the stranded metal wire is a stainless steel wire, but other metals could be used. Also, the wire could be coated with other polymeric materials, such as polyurethane, without departing from the scope of the present invention. The spinner arm 24 could also be constructed solely of a polymeric material, such as polyurethane, or any other material exhibiting characteristics of strength, flexibility and resiliency similar to that of the nylon coated stranded stainless steel wire of the preferred embodiment. The flexibility of the spinner arm 24 makes the lure 10, and especially the spinner blade 26, less susceptible to being caught in underwater obstructions, such as weeds or tree branches, or at least makes it more likely that the lure 10 will be freed from such obstructions, if caught. Preferably, the distal end 36 of the spinner arm 24 has a loop 48 for attachment of the spinner blade 26.

The spinner blade 26 is connected to the distal end 36 of the spinner arm 24 with a swivel 50 which permits the spinner blade 26 to spin relative to the spinner arm 24. In the preferred embodiment, the spinner blade 26 spins about a spinner blade axis B (see FIG. 3) when the lure is being pulled through the water by a line tied to the eyelet 38. Preferably, the spinner blade axis B and the shank axis S are substantially parallel to one another and lie in the same vertical plane. The spinner blade 26 causes resistance which provides a vibrating action when the lure 10 is moving through the water. Due to the lateral spacing between the head 20 and the spinner blade axis B in the lure of the present invention, the spinner blade 26 provides a unique "quivering" action which closely resembles a crawfish shooting up from a river or lake bottom, as if being pursued by prey. This quivering action provided by the laterally spaced spinner blade 26 is attractive to fish and also may serve to activate rattles or other sound producing devices attached to the lure 10. The spinner blade 26 illustrated in FIGS. 1 and 3 has a generally elongated shape and is commonly known as a "willow leaf" blade. Shorter, rounded blades, sometimes referred to as "Colorado" blades, will provide more resistance than the more elongate blades. Depending on the resistance and action desired, a variety of different spinner blade configurations could be used without departing from the scope of the present invention.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A fishing lure comprising:

a weighted head having a longitudinal axis;

a hook fixedly connected to the head, the hook having a shank portion and a curved butt portion, the shank portion projecting rearwardly from the head generally along a shank axis, the curved butt portion being at the rearward end of the shank portion and curving upwardly from the shank portion when the lure is in an upright position, the curved butt portion having a distal end portion with a barb;

a spinner arm extending downwardly from the head when the lure is in an upright position; and a spinner blade having a spinner blade rotational axis substantially parallel to the longitudinal axis and being attached to a distal end of the spinner arm wherein the rotational axis and the longitudinal axis lie in the same vertical plane.

2. The fishing lure of claim 1 wherein the spinner arm has a proximal end fixedly connected to the head.

3. The fishing lure of claim 2 wherein the hook is substantially planar.

4. The fishing lure of claim 3 wherein the hook and the spinner arm lie substantially in the same plane.

5. The fishing lure of claim 4 wherein the hook and the spinner arm lie substantially in the same vertical plane when the lure is in an upright position.

6. The fishing lure of claim 3 wherein the plane of the hook is a first plane, and wherein the shank portion of the hook lies in a second plane that is substantially perpendicular to the first plane, the barb of the hook being positioned on one side of the second plane, and the distal end of the spinner arm being positioned on the other side of the second plane.

7. The fishing lure of claim 2 wherein the spinner arm is an elongate resilient member.

8. The fishing lure of claim 7 wherein the spinner arm is of a polymeric material.

9. The fishing lure of claim 7 wherein the spinner arm comprises a stranded metal wire coated with a polymeric material.

10. The fishing lure of claim 2 wherein the spinner blade is connected to the distal end of the spinner arm with a swivel which permits the spinner blade to spin relative to the spinner arm.

11. A fishing lure comprising:

a weighted head having a longitudinal axis;

a substantially planar hook connected to the head, the hook having a shank portion and a curved butt portion, the shank portion projecting rearwardly from the head generally along a shank axis, the curved butt portion being positioned at the rearward end of the shank portion and curving away from the shank axis, the curved butt portion including a barb spaced from the shank axis;

a spinner arm having a proximal end and a distal end, the proximal end being fixedly connected to the head adjacent the shank axis; and a spinner blade having a spinner blade rotational axis substantially parallel to the longitudinal axis and being attached to the distal end of the spinner arm;

the hook and the spinner arm lying substantially in the same vertical plane when the lure is in an upright position with the curved butt portion of the hook and the spinner arm extending in generally opposite directions.

12. The fishing lure of claim 11 wherein the spinner arm is an elongate resilient member.

13. The fishing lure of claim 12 wherein the spinner arm is of a polymeric material.

14. The fishing lure of claim 13 wherein the spinner arm comprises a stranded metal wire coated with a polymeric material.

15. The fishing lure of claim 11 wherein the spinner blade is connected to the distal end of the spinner arm with a swivel which permits the spinner blade to spin relative to the spinner arm.

16. The fishing lure of claim 11 further comprising a weed guard extending from the head generally along a weed guard axis, wherein the spinner arm extends from the head generally along a spinner arm axis, the spinner arm axis and the weed guard axis forming an angle that is greater than 90 degrees but not greater than 180 degrees.

17. A fishing lure comprising:

a weighted head having a longitudinal axis;

a hook operatively connected to the head, the hook having a curved butt portion that curves generally upwardly from the head when the lure is in an upright position;

a spinner arm extending generally downwardly from the head generally along a spinner arm axis when the lure is in an upright position;

a spinner blade having a spinner blade rotational axis substantially parallel to the longitudinal axis and being attached to a distal end of the spinner arm wherein the rotational axis and the longitudinal axis lie in the same vertical plane; and a weed guard extending from the head generally along a weed guard axis;

wherein the spinner arm axis and the weed guard axis form an angle that is greater than 90 degrees but not greater than 180 degrees.

18. The fishing lure of claim 17 wherein the spinner arm axis and the weed guard axis form an obtuse angle.

19. The fishing lure of claim 17 wherein the hook is fixedly connected to the head, the hook having a shank portion and a curved butt portion lying substantially in the same plane, the shank portion projecting rearwardly from the head generally along a shank axis, the curved butt portion being positioned at the rearward end of the shank portion and curving away from the shank axis, the curved butt portion including a barb spaced from the shank axis.

20. The fishing lure of claim 19 wherein the plane of the hook is a first plane, and wherein the shank axis defines the intersection of a second plane with the first plane, the second plane being substantially perpendicular to the first plane, the barb of the hook being positioned on one side of the second plane and the distal end of the spinner arm being positioned on the other side of the second plane.

* * * * *